(12) United States Patent
Kittel

(10) Patent No.: US 9,062,427 B2
(45) Date of Patent: Jun. 23, 2015

(54) EXTRACTING ENERGY FROM FLOWING FLUIDS

(75) Inventor: Peter John Kittel, Queensland (AU)

(73) Assignee: Axis Energy Group Pty Ltd, Southport (AU)

( * ) Notice: Subject to any disclaimer, the term of this patent is extended or adjusted under 35 U.S.C. 154(b) by 92 days.

(21) Appl. No.: 13/809,594

(22) PCT Filed: Aug. 19, 2011

(86) PCT No.: PCT/AU2011/001058
§ 371 (c)(1),
(2), (4) Date: Aug. 23, 2013

(87) PCT Pub. No.: WO2012/006688
PCT Pub. Date: Jan. 19, 2012

(65) Prior Publication Data
US 2013/0320678 A1 Dec. 5, 2013

(30) Foreign Application Priority Data

Jul. 13, 2010 (AU) ................................. 2010903105

(51) Int. Cl.
| F03B 13/00 | (2006.01) |
| H02P 9/04 | (2006.01) |
| E02B 9/06 | (2006.01) |
| F03B 3/18 | (2006.01) |
| F03B 13/10 | (2006.01) |
| F03B 17/06 | (2006.01) |
| F03B 11/00 | (2006.01) |

(52) U.S. Cl.
CPC ... *E02B 9/06* (2013.01); *F03B 3/18* (2013.01); *F03B 13/10* (2013.01); *F03B 17/062* (2013.01); *F05B 2240/13* (2013.01); *F05B 2240/40* (2013.01); *F05B 2240/931* (2013.01); *F05B 2240/97* (2013.01); *Y02E 10/28* (2013.01); *Y02E 10/223* (2013.01); *Y02E 10/38* (2013.01); *Y02E 10/22* (2013.01); *F03B 11/00* (2013.01)

(58) Field of Classification Search
CPC .............. E02B 9/06; F03B 11/00; F03B 3/18; F03B 17/062; F03B 13/10; F05B 2240/13; F05B 2240/931; F05B 2240/40; F05B 2240/97; Y02E 10/223; Y02E 10/22; Y02E 10/28; Y02E 10/38
USPC .................. 290/42, 43, 53, 54; 415/3.1, 4.3, 7
See application file for complete search history.

(56) References Cited

U.S. PATENT DOCUMENTS

| 4,363,564 | A | 12/1982 | Borgren | |
| 7,528,498 | B2 * | 5/2009 | Yeh | ................................. 290/55 |

(Continued)

FOREIGN PATENT DOCUMENTS

| GB | 0503268.5 | 5/2005 |
| JP | 200700983 | 1/2007 |

*Primary Examiner* — Javaid Nasri
(74) *Attorney, Agent, or Firm* — Bay State IP, LLC

(57) ABSTRACT

A Barrage apparatus is a method and device for extracting energy from flowing fluids in an open flow by means of a submerged barrage or barrages that obstruct and channel flows at increased velocities to downstream turbine power take off modules. Increasing the velocity of the flow increases the amount of power available for extraction thereby providing opportunities to extract energy from low flow sites and facilitate the use of low cost small marine turbines to provide an ecologically sound, efficient and cost effective method of renewable energy extraction from fluid flows.

13 Claims, 13 Drawing Sheets

(56) References Cited

U.S. PATENT DOCUMENTS

| | | | |
|---|---|---|---|
| 7,804,186 B2 * | 9/2010 | Freda | 290/55 |
| 8,736,098 B2 * | 5/2014 | Choi et al. | 290/55 |
| 8,814,493 B1 * | 8/2014 | Komp | 415/1 |
| 2002/0158472 A1 | 10/2002 | Robson | |
| 2005/0236843 A1 | 10/2005 | Roddier | |
| 2007/0241566 A1 | 10/2007 | Kuehnle | |
| 2007/0284884 A1 | 12/2007 | Stothers et al. | |
| 2009/0045632 A1 * | 2/2009 | Krauss | 290/54 |
| 2009/0226296 A1 | 9/2009 | Bibeau et al. | |
| 2010/0084862 A1 | 4/2010 | Unno | |
| 2010/0129193 A1 | 5/2010 | Sherrer | |
| 2013/0099502 A1 * | 4/2013 | Roberts | 290/54 |

* cited by examiner

EXTRACTING ENERGY FROM FLOWING FLUIDS

CROSS REFERENCE TO RELATED APPLICATION

This application is for entry into the U.S. National Phase under §371 for International Application No. PCT/AU2011/001058 having an international filing date of Aug. 19, 2011, and from which priority is claimed under all applicable sections of Title 35 of the United States Code including, but not limited to, Sections 120, 363, and 365(c), and which in turn claims priority under 35 USC 119 to Australian Patent Application No. 2010903105 filed on Jul. 13, 2010.

TECHNICAL FIELD OF THE INVENTION

The present invention relates to a method and apparatus for extracting energy from flowing fluids. More specifically the invention is an improved method of increasing the efficiency of extracting energy from flowing fluids.

DESCRIPTION OF PRIOR ART

Global concern about climate change and the environmental cost and impact of consuming fossilised fuels for electricity generation has created impetus to find clean and efficient renewable technologies for power generation. Energy extraction from flows in rivers, ocean currents and tides provide options for a clean and renewable energy supply.

A number of existing marine turbine technologies are capable of generating electricity, but most incur capital and ongoing maintenance costs that are too high to provide long term viable electricity supply. Historically, hydraulic turbines were developed for hydropower installations that dam water. Shore to shore tidal barrages use the same damming method with tidal flows to create a hydraulic head to channel flow across turbines that are usually mounted within the barrage. In both cases the turbines drive electricity generators. Dams and barrages are efficient but incur major capital and environmental costs and consequently better solutions are preferred.

A further development in marine power generation is the proposed use of open flow barrages that operate in open streams or marine currents. Open flow barrages comprise large wall structures with openings within the barrage wall to accommodate turbines or alternatively stacked turbines are used to create a barrage wall. Typically open flow barrages produce power but are not able to channel flow as efficiently as a traditional dam or barrage due to the fact that fluid has no fixed shape and has little resistance to outside stress, such as a barrage, and will seek to flow around the barrage and turbines with load factors potentially limiting flow to the turbines which limits efficiency and reduces potential power extraction.

Another method of marine power generation uses low head hydro turbines that operate in free flow currents without the need for a barrage. Open turbines need to sweep large areas to obtain commercially viable power supply from fluid flow. These propeller type turbines placed in a moving stream of water are subject to the limitation that fluids tend to flow around rather than through energy capture devices. To overcome this limitation the turbines are constructed with very large rotor diameters of approximately 20 meters. Such large sized turbines must be highly engineered to withstand stress loads and the harsh marine environment and as such incur substantial capital and maintenance costs that consequently impact on electricity supply costs.

US Patent Publication No. 2007/284884 describes a flow enhancer for an underwater turbine and which includes an augmenter device which can comprise a second duct extending about the first duct of the turbine. There is no description of a parabolic barrage to increase fluid velocity prior to the fluid passing into a turbine positioned at each curved end of the barrage.

Japanese patent application JP2007009833 describes an ocean current generating device having an inner pipe through which water can flow and which contains a turbine, and a surrounding outer pipe through which water can flow and which does not contain a turbine. The arrangement is said to improve stability to the apparatus when tethered to the seabed and to improve power collection. There is no description of a parabolic barrage to increase fluid velocity prior to the fluid passing into a turbine positioned at each curved end of the barrage.

A more recent development is the use of free flow ducted turbines designed to exploit the pressure differential around a turbine to create a venturi effect. These types of venturi turbine duct are claimed to be approximately three times more efficient than an open turbine. However the need to use large size turbines required to extract commercial quantities of energy means that large size ducts are required that are typically highly engineered due to their size and the fact that due to the axial forces acting on the submerged devices expensive robust steel structures required.

There is a need for next generation fluid energy extraction devices that incur lower capital and operational costs in order to provide commercially viable renewable energy. These issues present challenges and opportunities for well-engineered design solutions.

OBJECT OF THE INVENTION

It is an object of the present invention to at least ameliorate one or more of the aforementioned disadvantages and shortcomings, or at least provide the public with a useful alternative.

Further objects will be evident from the following description.

SUMMARY OF THE INVENTION

The Barrage apparatus in one form, although it need not be the only, or indeed the broadest form, provides a method and apparatus to increase the velocity of fluid flows that are channeled to turbines to extract energy from flowing fluid. Kinetic energy in fluid flows is energy due to the movement and velocity of the flow. The faster the velocity is the greater the energy. If flow velocity is doubled the approximate potential power output is increased eight fold as the potential power is a function of the water velocity cubed. The main constraint for the marine energy industry seeking to in extract energy from flowing fluids is the difficulty in obtaining sufficiently high velocity flows that enable efficient generation of power. Globally, there are limited high velocity flow sites. Currents of less than two meters per second are generally not considered viable for commercial power generation.

Thus, in one form the invention resides in a barrage apparatus for extracting energy from a fluid flow, the apparatus comprising:
a barrage having a surface adapted to increase the velocity of fluid flowing along the surface, and at least one turbine module having an inlet, an outlet and a turbine, the inlet being spaced from the surface, said increased velocity fluid able to flow into the inlet, operate the turbine and flow out of the outlet, the spacing between the surface and inlet defining a by-pass opening to direct increased velocity fluid past the turbine module and the outlet to assist in passage of fluid through the turbine module.

One embodiment of the invention resides in the method and use of submerged obstacles or barrages (hereinafter referred to as a Barrage) that are comprised of manufactured, impervious, solid geometric shapes. The Barrage is submerged in flows and operates as either a gravity-weighted device with a density greater than the fluid in which it is immersed or is a lightweight device with a density less than the fluid within which it is immersed. Fluid flows seek the path of least resistance flowing around and away from an obstruction or blockage. The fluidity of flow around obstacles limits the efficiency of open flow marine energy extraction devices. Fluids tend to flow around rather than through energy capture devices. The Barrage apparatus overcomes this limitation by using an upstream barrage positioned to sweep a large area of flow that the Barrage partially obstructs and channels accelerated velocity flows into and around downstream turbines. The Barrage creates a lens effect with the diverted incoming water flow creating a region of augmented, high-velocity flow. The focusing of the kinetic energy from a large area into a smaller area creates the desirable effect of increasing the velocity through the turbines well above the free stream velocity. The increased velocity flows drive turbines that are connected to an electricity generator to provide electricity via a submerged cable to a grid or other end use. Diffuser ducts containing small low cost cross-flow turbines power take off modules are optionally utilised to augment the accelerated flows exiting a Barrage. The diffuser ducts are positioned to ensure that there is sufficient open space between the barrage and duct to ensure the volume of flow is not impeded and that flows go into and around the diffusers.

More specifically the general flow is diverted by the Barrage to form two streams that are channeled along the Barrage face within the confines of a base and top plate of the Barrage to exit at a position of least resistance that is the open extremities of each end of the Barrage. The higher velocity streams exit the Barrage to flow downstream either side of the low-pressure area created downstream behind the Barrage. A Barrage optionally utilises a plurality of turbines that form a Barrage installation wherein turbines are either attached to the downstream ends of the Barrage or are independently positioned at a distance from the Barrage so that they are swept by the downstream high velocity flows. The turbine configuration is preferably a cross flow Darrieus type turbine but other types of known turbines can also be suitably employed. Typically, turbine blades are attached to a shaft and they rotate around the vertical axis when subjected to fluid flows thereby causing the shaft to rotate. The Turbine preferably includes a power take off means that is connected directly or indirectly to the shaft of the Turbine. The power take off may include gearing and an electricity generator that feeds electricity via a cable to an electricity grid or other end-user by known suitable means. A turbine and power take off module is preferably mounted within individual module structure so that it may be separately installed or removed from a Barrage Installation for repair, maintenance or replacement. The types of turbines utilised may vary and they may be mounted horizontally or vertically depending on location and construction requirements. The velocity of channeled downstream flows sweeping the Turbines is determined by both the general flow rate within which the Barrage is submerged and the size of the Barrage. The larger the Barrage is the greater the velocity of the downstream flow. The faster the velocity is, the greater the energy available to be extracted by the turbines. A Barrage installation provides a more efficient method of extraction of power. Where identical turbines are submerged within a common fluid flow and one turbine is sited downstream of a Barrage it will provide more power than the turbine that is not influenced by the Barrage. A Barrage installation extracts energy more efficiently when the downstream turbines are contained within ducts. Embodiments of the invention operate in one-way flows encountered in rivers and certain ocean currents and in two-way flows wherein energy is extracted from both ebb and flood tides. Multiple configurations of Barrages and turbines can be deployed in various arrays or series to form energy extraction farms.

The invention that is a Barrage apparatus has various embodiments that are either, a lightweight apparatus (i.e. with a density less than water) or is a lightweight apparatus that is fixed to gravity-weighted base (i.e. the base has a density greater than water) or is a gravity-weighted installation (i.e. the Barrage is fabricated in materials that have a density significantly greater than water).

A lightweight Barrage and Turbine apparatus is preferably manufactured as a single structure that comprises a Barrage, Turbine power take off modules and a floatation device. The lightweight Barrage apparatus apart from directing and accelerating fluid flows to the turbines can also be a sealed vessel that operates as a floatation device for the apparatus. Alternatively, the Lightweight apparatus may be fitted with other floatation/ballast tanks. The apparatus is preferably submerged in a fluid flow in a neutrally buoyant position with desired levels of buoyancy achieved by pumping compressed air or water into floatation tanks or floatation Barrage. The apparatus may be anchored to the sea or riverbed or may be mounted beneath a barge or other vessel. There are varied known anchoring options that have been developed in marine oil exploration. The Barrage apparatus will preferably be manufactured using structurally sound, strong, lightweight materials such as tubular steel and sheeting, tubular aluminium and sheeting, geo textiles, plastics, glass fibres, composite fibres, synthetic materials or other non-corrosive high strength materials. The lightweight Barrage apparatus is alternatively fitted to a gravity-weighted base manufactured in concrete or some other suitable dense material so that it has a density greater than water so that apparatus can be weighted into position on a riverbed or seabed. The Lightweight apparatus in either format, when constructed from the materials previously described, is inexpensive compared to existing or proposed marine power extraction facilities. The advantage of lightweight apparatus is that it can be purchased from or manufactured by existing suppliers as off the shelf items, flat packed and stored ready for deployment and assembly on site and installed with minimal installation costs for this type of equipment. A further advantage is that the lightweight apparatus incorporating floatation devices can be detached from the gravity weighted base for repair, maintenance or replacement at the marine site surface and on completion of works can be reinstalled to the submerged base in a timely manner. A gravity-weighted Barrage installation, with a density significantly greater than water, is positioned on a seabed, riverbed, or bottom of a canal or other man made channel containing flowing fluids. The Barrage is preferably a manufactured permanent structure with an operational life of 40 plus years that forms a dense impervious mass that diverts and accelerates flows to turbine modules. Gravity-weighted Barrages are typically fabricated in concrete to form solid structures or are manufactured from other suitably dense impervious materials that may include filled geotextile sand bags, stone walls, stacked precast concrete shapes, gabions filled rock or dense non-polluting recycled materials, fabricated steels or other long life materials that are structurally sound and of sufficient weight and density to be weighted in position and capable of diverting fluid flows and withstanding harsh marine conditions and axial forces of currents. The Barrage may also be fabricated as a shell form that is fabricated in concrete or other suitable materials. The shell form is optionally filled with dense materials like rocks, sand, bricks, concrete or other dense natural or non-polluting recycled materials. Pluralities of turbine modules contained within a structure that is fixed to a gravity-weighted base are independently positioned within the high velocity flows exiting the permanent gravity weighted Barrage or barrages. Alternatively turbine power take off modules are attached to the rear of the gravity weighted Barrage in a suitable arrangement that facilitates their detachment and retrieval for purposes of maintenance, repair or replacement. The position of the turbine power take off module is an offset position that is within the accelerated downstream flows exiting the Barrage. In both instances the turbine power take off modules are comprised of a structural housing that contains a turbine and power take off unit that generates electricity that is transmitted to a grid or other end user. Gravity-weighted Barrage installations can be utilised in one and two way flow configurations previously described. The capital costs of a gravity weighted Barrage are offset by the longevity of an installation. The Barrage installations have the advantage that the only moving mechanical components of an installation are contained within the light weight, interchangeable, modular turbine power take off modules are easily extracted for repair or economical replacement as required over the life of the installation.

Both the lightweight and gravity weighted Barrage installations provide the opportunity to use smaller mass-produced turbines that are more cost effective than turbines currently in use in marine power generation. Turbines that efficiently extract power from both one and two way flows are available off the shelf. Smaller turbines can be utilised because the large sweep area of a submerged Barrage channels high velocity concentrated flows to the turbine blades so that smaller turbines extract energy efficiently. The higher the velocity of a flow channeled to a turbine is, the greater is the power available for extraction. To increase the potential energy extraction from a Barrage installation there are options of increasing the number or size of turbines, increasing the Barrage size and or using multiple Barrages and turbines. Barrage installations are minimally engineered and there are opportunities to manufacture Turbines using injection-moulded plastics or other cast or moulded processes that use relatively inexpensive materials. There is a further opportunity to use recycled materials in the manufacturing process. While the opportunity exists to use smaller turbines it should be noted that an installation is not limited to small turbines and large or other types of turbines will operate more efficiently when subject to the higher velocity flows delivered by a Barrage apparatus. The increased velocity flows and consequent increased kinetic energy within the streams provided by the Barrage creates opportunities for energy extraction from low flow sites that were previously considered uncommercial. As high velocity flow sites are limited globally this the ability to extract energy from the plentiful low flow sites that are often near to shore is a major advantage. Close to shore installations provide cheaper infrastructure costs and power transmission losses are reduced. The core structure of a Barrage apparatus can be fabricated at low cost using concrete or other low cost materials. Costs are further reduced by the use of smaller cheaper turbines. Lower capital and operational costs provide lower cost electricity generation.

Throughout this specification the aim has been to describe the invention without limiting the invention to any one embodiment or specific collection of features.

BRIEF DESCRIPTION OF DRAWINGS

In order to present the invention so that it may be readily understood and put into practical effect, reference will now be made to the accompanying illustrations wherein.

Persons skilled in the relevant art may realise variations from the specific embodiments that will none the less fall within the scope of the invention. Further features of the present invention will become apparent from the following detailed description.

DETAILED DESCRIPTION OF THE PREFERRED EMBODIMENTS OF THE INVENTION

Figure 1:
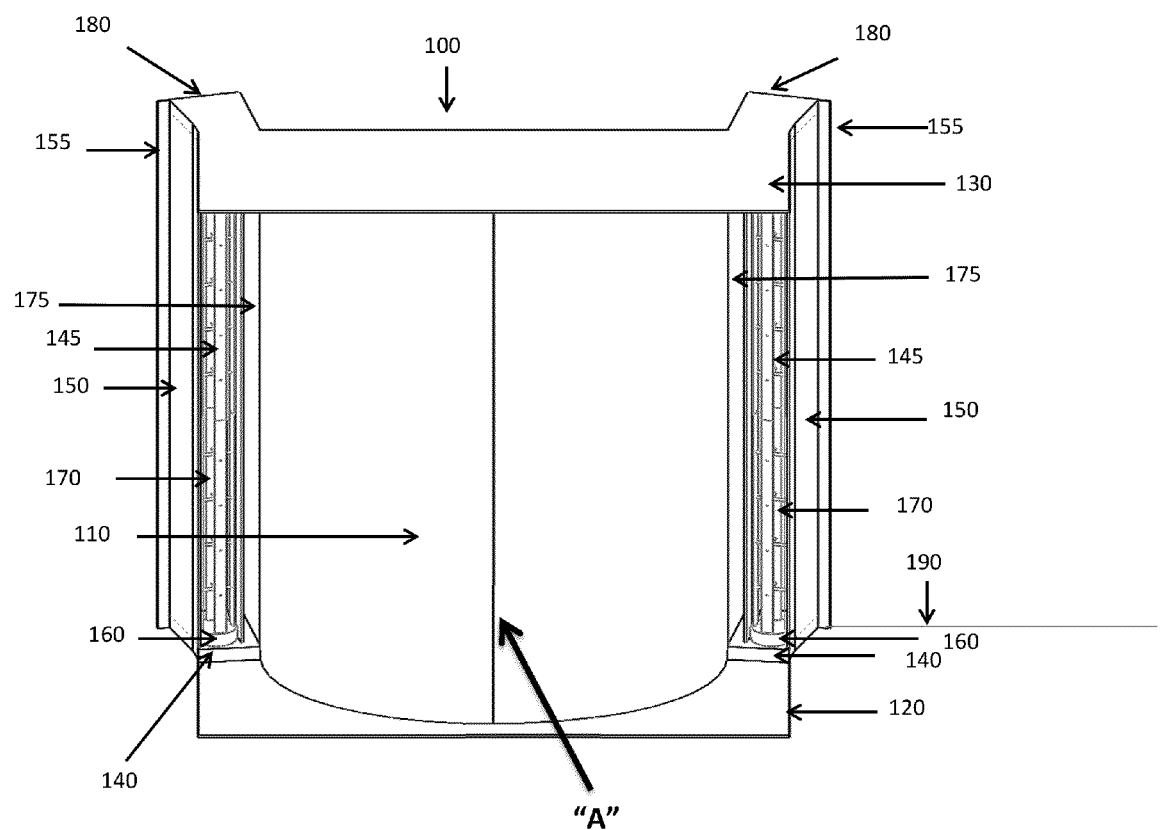
FIG. 1 shows a schematic front view of a parabolic Barrage fitted with two diffuser ducted turbines.
Figure 2:
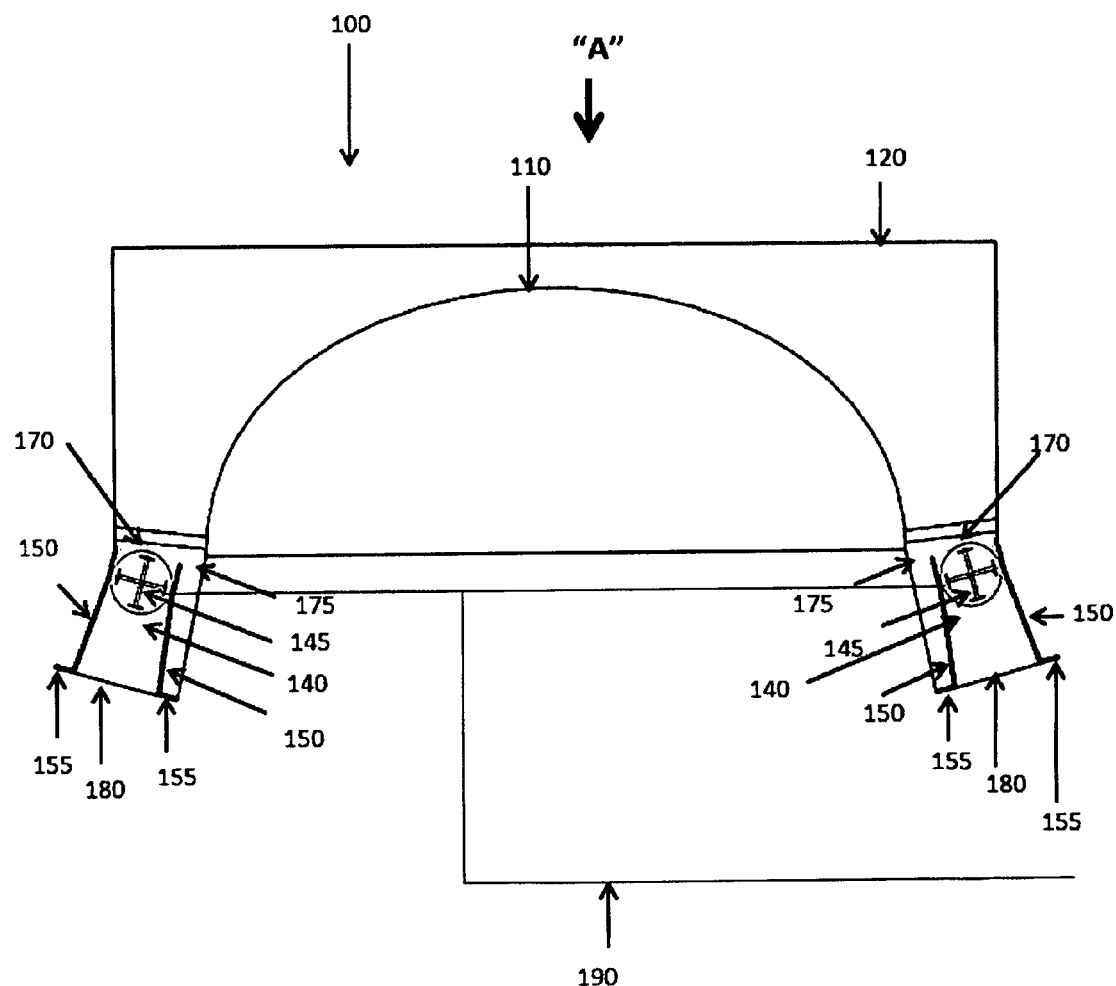
FIG. 2 shows a schematic plan view of a parabolic Barrage fitted with two diffuser ducted turbines.

FIG. 1 shows a schematic plan view of an embodiment of the invention that is a Barrage apparatus 100 that provides a method of energy extraction from flowing fluids. The Barrage apparatus 100 is submerged within a flowing fluid for example a river or ocean currents and is preferably positioned perpendicular to the direction of the flow is that is marked by an arrow and the letter "A". The Barrage apparatus 100 is comprised of barrage 110 that is a parabolic shape or other suitable geometric shapes that are constructed from impervious materials that create a partial obstacle to flow that is channeled between a base plate 120 and top plate 130 to the outside extremities of the Barrage 110. Such flows are directed to Turbine/power take of modules 140 that contain a cross flow turbine 145 and a power take off 160 that supply electricity to a grid or other end user via subsea transmission cable 190. Diffuser ducts 150 have an inlet opening 170 side walls that taper outwardly to exit via the wider outlet 180 that is fitted with flange plates 155. Turbine power take off modules 140 are positioned within the diffuser ducts 150 at the inlet 170 so that flows entering the inlet 170 are drawn across the turbine 145 to exit via the outlet 180. The diffuser ducts 150 are mounted in an offset position at the rear of the parabolic Barrage 110 at a dimension that provides a suitable open space area 175. FIG. 2 shows a schematic plan view of an embodiment of the invention that is a two turbine Barrage apparatus 100 that is preferably submerged in a position that is perpendicular to the direction of flow that is marked by an arrow and the letter "A". A submerged Barrage apparatus 100 in an open free stream flow a partially obstructs flow. The obstructed water flows along the path of least resistance flowing around and away from the obstruction created by the Barrage apparatus 100. The oncoming general flow impeded by an impervious parabolic Barrage wall 110 divides to form two separate streams that are confined between a top plate 130 (omitted for clarity) and a base plate 120 are channeled across the face of the parabolic Barrage wall 110. The flows exit at the path of least resistance that is the open extremities at the sides of the parabolic Barrage wall 110. The parabolic Barrage wall 110 creates a lens effect with the diverted water flow creating a region of augmented, high-velocity flow that is channeled by the parabolic Barrage wall 110 into the inlet 170 of the diffuser ducts 150 that contain a turbine power take off module 140 (shown transparent for clarity). Mounted within the Turbine module 140 in the flow passage 170 to 180 for rotation above a vertical axis around a shaft is a Turbine 145 that is comprised of blades for extracting energy from the fluid flowing through the Turbine module 140. A power take off 160 mounted at the base of the Turbine module 140 is coupled to the Turbine shaft through any suitable transmission such as a gear transmission such that rotation of the shaft causes the power take off or dynamo 160 to generate electricity. An electrical cable 190 is connected to the power take off 160 and leads to an above surface location power grid or other end user. The openings 175 allow the flows from the parabolic Barrage wall to flow around the diffuser ducts 150. Each diffuser duct 150 has a narrow inlet 170 that tapers outwardly to the wider outlet 180 that is fitted with a flanged end plates 155. The diffuser duct 150 maximises the low pressure region that is formed behind the turbine power take off module 140. The decrease in pressure is desirable because it creates a suction effect that draws additional flows across the turbine 145. The diffuser duct 150 therefore creates a venturi effect that augments flows that is assisted by the opening 175 that allows flows exiting the parabolic Barrage wall 110 to flow around the diffuser duct 150 to assist in the venturi effect. The focusing of the kinetic energy from a large area into a smaller area creates the desirable effect of increasing the velocity through the turbine modules 140 well above the free stream velocity that is augmented by the diffuser duct 150. This allows for the use of low cost smaller diameter turbines (potentially one tenth the size) to supply a similar power output to turbines currently being trailed in the marine energy extraction industry.

Figure 3:
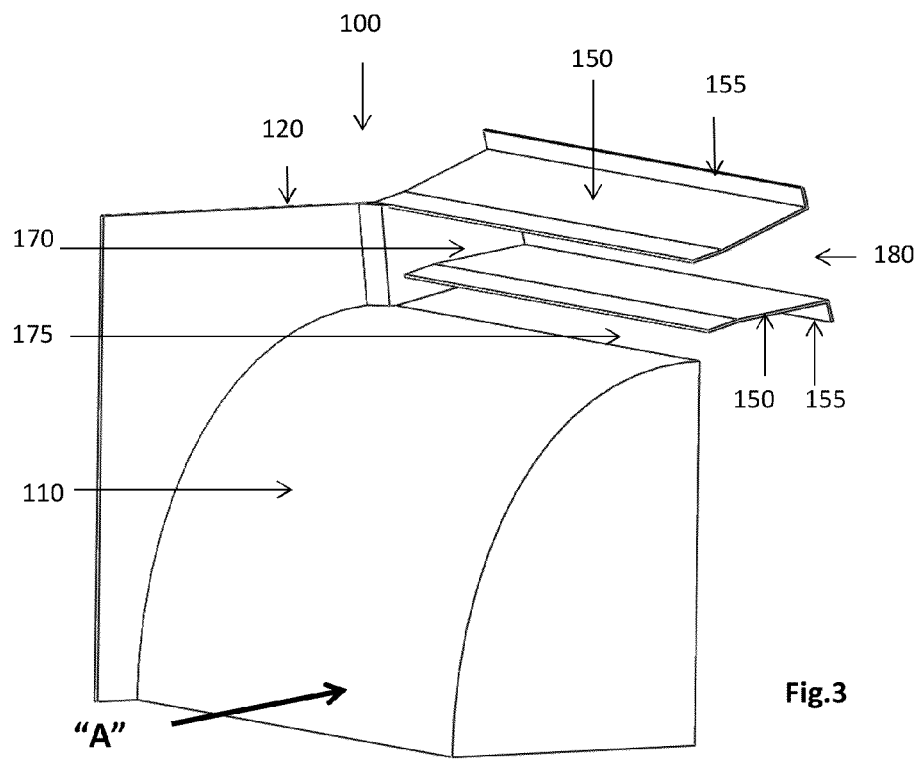
FIG. 3 shows a schematic cross-section of a half section of a parabolic Barrage and diffuser duct.

FIG. 3 shows a schematic cross-sectional detail that is a half section of a parabolic Barrage 100 apparatus. The base plate 120 and a top plate (omitted for clarity) enclose the parabolic Barrage wall 110 and the diffuser duct walls 150. Diffuser duct walls 150 form a flow passage between the inlet opening 170 and the outlet opening 180. Flange plates 155 are fitted to the rear of the diffuser duct walls 150. The diffuser duct walls 150 are positioned offset and downstream from the parabolic Barrage wall 110 at a dimension to allow a suitable opening 175 between the two. The direction of flow is marked by an arrow and the letter "A" and the parabolic Barrage wall 110 directs flows to the flow passage 170 to 180 as previously described. Turbine power take off modules are not shown.

Figure 4:
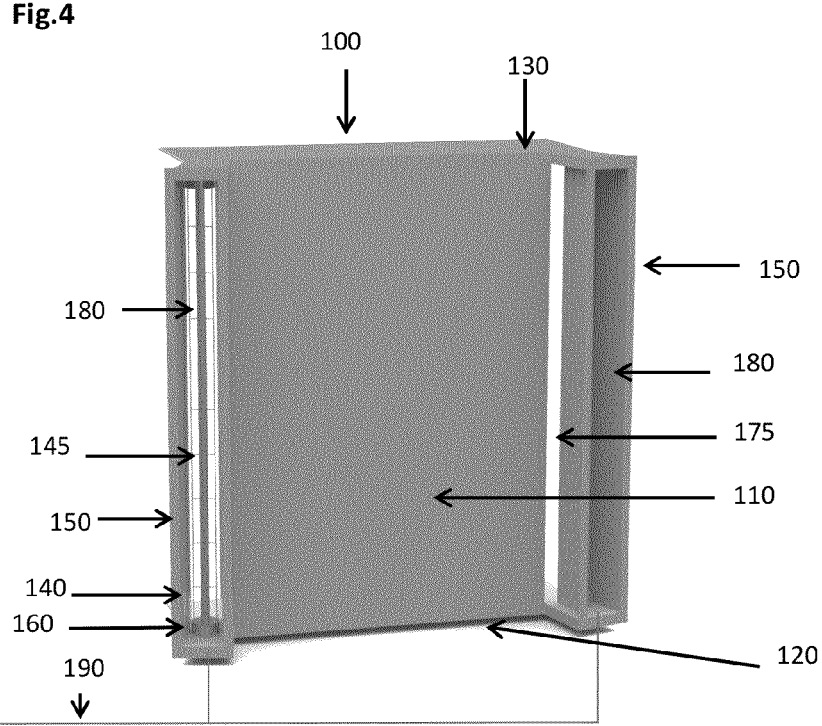
FIG. 4 shows a schematic rear view of the parabolic Barrage fitted with two diffuser ducted turbines.

FIG. 4 shows a schematic rear view of the parabolic Barrage apparatus 100 fitted with two diffuser ducts 150 and parabolic wall 110 enclosed by a top plate 130 and a base plate 120. The diffuser ducts 150 contain a turbine module 140 that comprises a turbine 145 and power take off 160 that generates electricity that is transmitted to a grid or other end user by a subsea cable 190. The diffuser duct 150 outlet opening 180 and the opening 175 between the parabolic wall 110 and the diffuser ducts 150 facilitate the exiting of flows.

Figure 5:
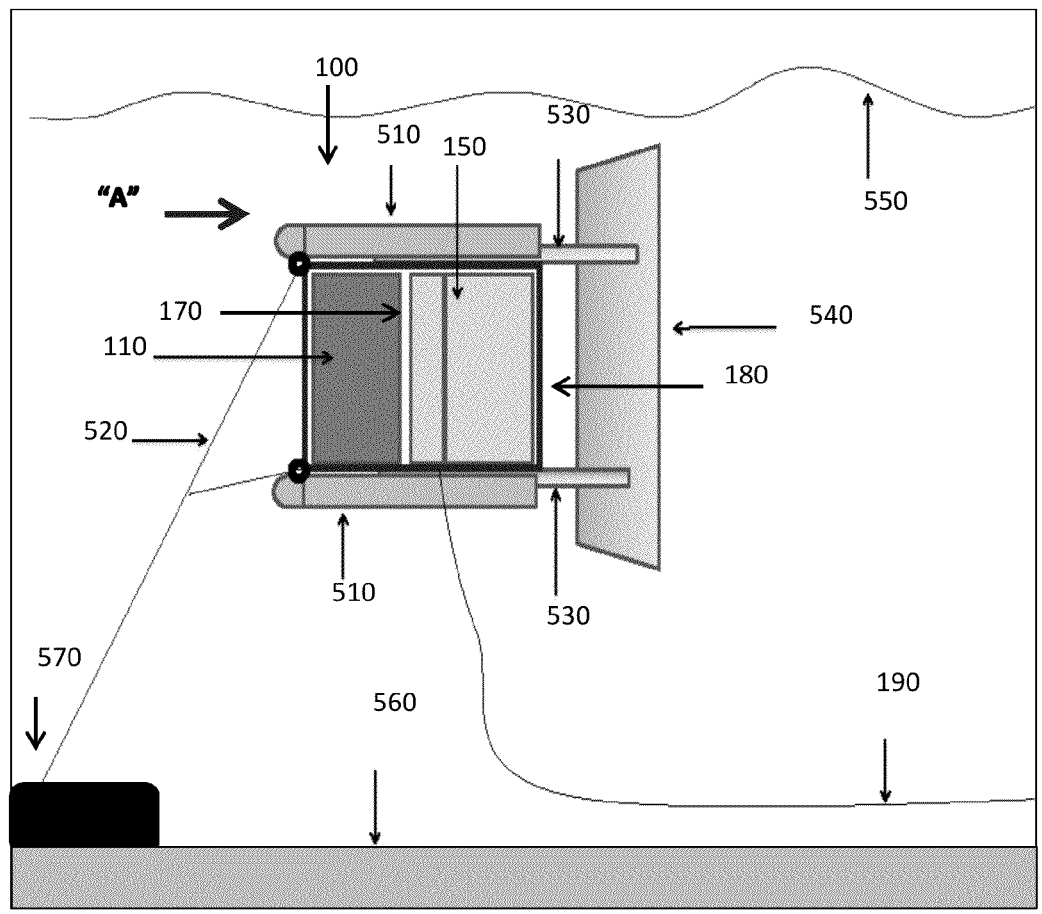
FIG. 5 shows a schematic side view of a parabolic Barrage fitted with two diffuser ducted turbines depicted as a neutrally buoyant submerged device.
Figure 6:
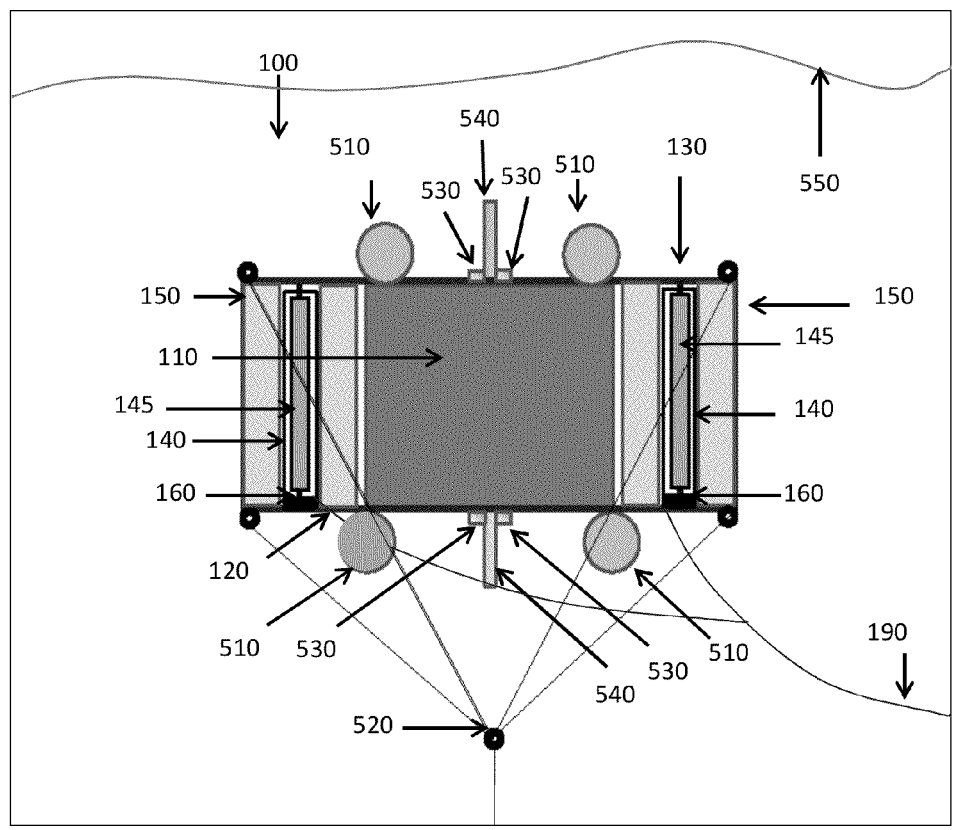
FIG. 6 shows a schematic cross sectional view parabolic Barrage fitted with two diffuser ducted turbines depicted as a neutrally buoyant submerged and tethered device

FIG. 5 shows a schematic side view of a Barrage apparatus 100 that is a further embodiment of the invention. The apparatus 100 is submerged and neutrally buoyant under the sea level 550 suitably held in position by tethered by a cable 520 anchored to a mooring 570 on the seabed 560 that is suitable for two-way flows. The Barrage apparatus 100 is manufactured as a lightweight structure capable of withstanding the axial forces acting upon it and is suitably be comprised of tubular steel or aluminium structural members, plastics, geotextiles and composite or other lightweight structural materials. The apparatus 100 is fitted with floatation tanks 510 that are suitably fixed to the structure of the apparatus 100 to achieve a density that is less than water. Known technology is used to alternately pump water or compressed air from an external source via inlet and outlet valves to raise, lower and maintain a suitable position of the apparatus 100 within a fluid flow. A fixed rudder 540 is attached to the rear of the barrage apparatus 100 by support arms 530 so that when tidal flows or currents change direction the rudder 540 steers the parabolic barrage wall 110 to face oncoming the direction of flow that is indicated by an arrow and the letter "A". The parabolic Barrage wall 110 accelerates and channels flows to the diffuser duct 150 opening 170 where turbine power take off modules (that are obscured by the diffuser 150) extract energy from the flow that exits via outlet 180. The electricity generated is transmitted via a subsea cable 190 to a grid or other end user as previously described. FIG. 6 shows a schematic cross sectional view of a Barrage apparatus 100 as previously described in relation to FIG. 5. The Barrage apparatus 100 is submerged beneath the sea level 550 and is anchored via cables 520 to the sea floor (not shown). Floatation tanks 510 are suitably mounted on the top 130 and base 120 of the Barrage apparatus 100. A fixed rudder 540 is attached to support arms 530 that are suitably mounted on the base plate 120 and top plate 130 of the apparatus 100. The parabolic barrage 110 accelerates flows and directs them to the downstream turbine modules 140 comprised of a cross flow turbine 145 with a power take off 160 extract the energy from the flow in the manner previously described. The electricity generated is fed to the electricity grid or other end user via the cable 190.

Figure 7:
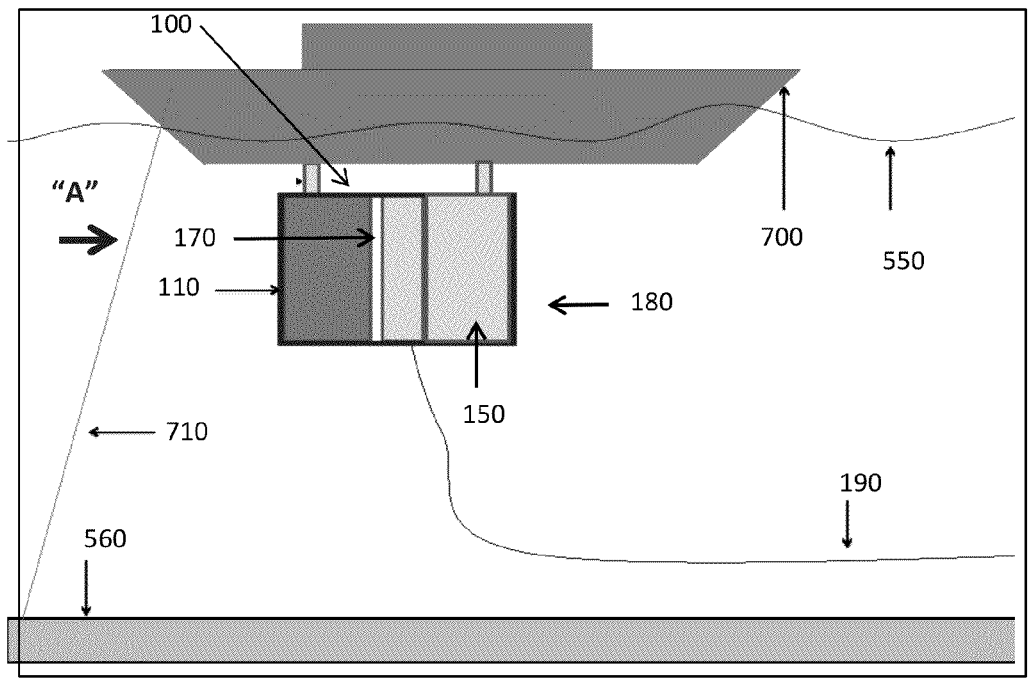
FIG. 7 shows a schematic side view of a parabolic Barrage fitted with two diffuser ducted turbines fixed to the underside of a barge.

FIG. 7 shows a schematic side view of a another embodiment of the invention that is a lightweight Barrage apparatus 100 fitted with a parabolic barrage wall 110 with diffuser ducts 150 obscuring the turbine power take off modules contained therein. The barge 700 is preferably anchored and secured by cables 710 to the seabed 560 so that the apparatus 100 is submerged in a suitable position within the direction flows marked by an arrow and the letter "A". The barge responds to changes in flow direction so that the parabolic wall 110 faces the oncoming flow that is channeled as accelerated flows to the diffuser ducts 150 The turbine modules extract energy from the flow entering openings 170 and exiting opening 180 and the turbine power take off modules generate electricity as previously described. The electricity generated is fed via cable 190 to a grid or other end user.

Figure 8:
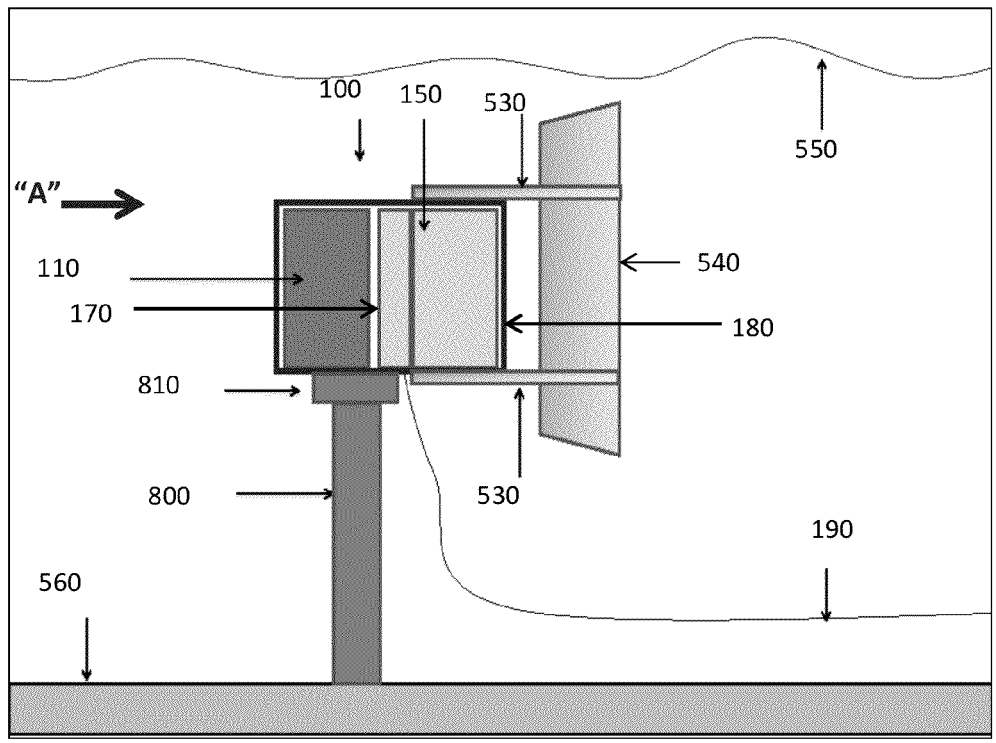
FIG. 8 shows a schematic side view parabolic Barrage fitted with two diffuser ducted turbines mounted on a monopole that is embedded in the sea bed.

FIG. 8 shows a further embodiment of the invention is shown as schematic side view of a Barrage apparatus 100 is mounted on a monopole 800 embedded in the sea bed 560. The Barrage apparatus 100 is manufactured as a lightweight structure capable of withstanding the axial forces acting upon it that is suitably be comprised of tubular steel or aluminium structural members, plastics, geotextiles and composite or other lightweight structural materials. The apparatus 100 is suitably connected to turntable 810 that is mounted on the monopole 800 embedded in the sea bed 560. A fixed rudder 540 is attached to the rear of the barrage apparatus 100 by support arms 530 so that when tidal flows or currents change direction the rudder 540 causes the barrage apparatus 100 to yaw on its vertical axis and turn so that the parabolic Barrage wall faces oncoming the direction of flow that is indicated by an arrow and the letter "A". The parabolic Barrage wall 110 accelerates and channels flows to the opening 170 of diffuser duct 150 where turbine power take off modules (that are obscured by the diffuser 150) extract energy from the flow that exits via outlet 180. The electricity generation and transmission via a subsea cable 190 to a grid or other end user is as previously described.

Figure 9:
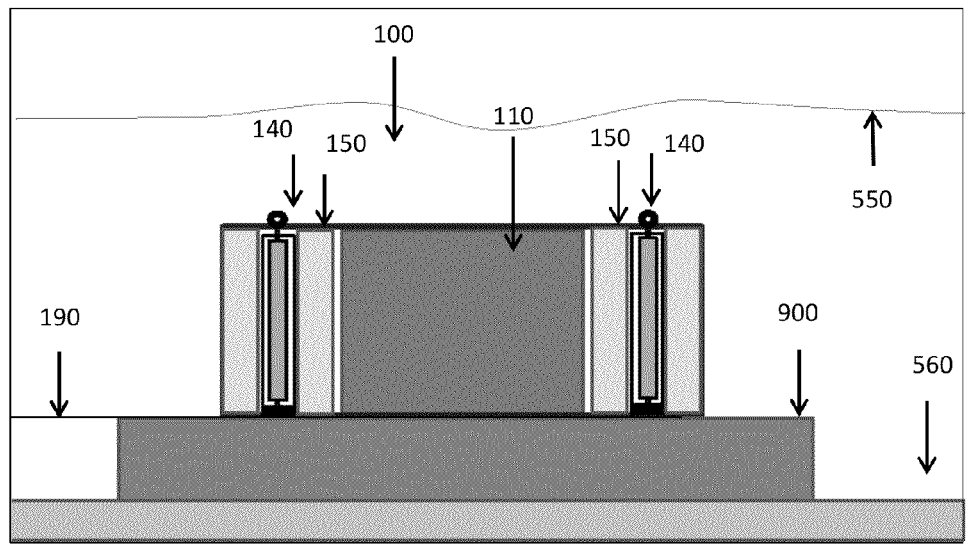
FIG. 9 shows a schematic cross sectional view of the parabolic Barrage fitted with two diffuser ducted turbines fixed to a gravity weighted base positioned on a seabed.

FIG. 9 shows a schematic cross sectional view of the Barrage apparatus 100 as described in relation to FIGS. 1, 2, 3, and 4 that is fixed to a gravity weighted base 900 positioned on a seabed 560.

The apparatus 100 is submerged beneath the sea level 550 sited perpendicular to the direction of flow. The parabolic Barrage 110 splits and accelerates flows to the turbine modules 140 that are contained within the diffuser duct. The parabolic apparatus 100 may optionally be manufactured from heavy dense or lightweight materials. When the Barrage wall 110 and the diffuser ducts 150 are fabricated with heavy gravity weighted materials like concrete the turbine modules 140 which are the only moving component in the barrage can be extracted from the diffuser ducts 150 and brought to the surface for replacement or maintenance. The barrage apparatus can remain on the seabed 560 as a semi-permanent structure with the turbine modules 140 being replaced as required. This embodiment of the invention provides for major savings in maintenance and operational costs and diminishes power generation downtime in maintenance cycles or in the event of catastrophic turbine failure.

Figure 10:
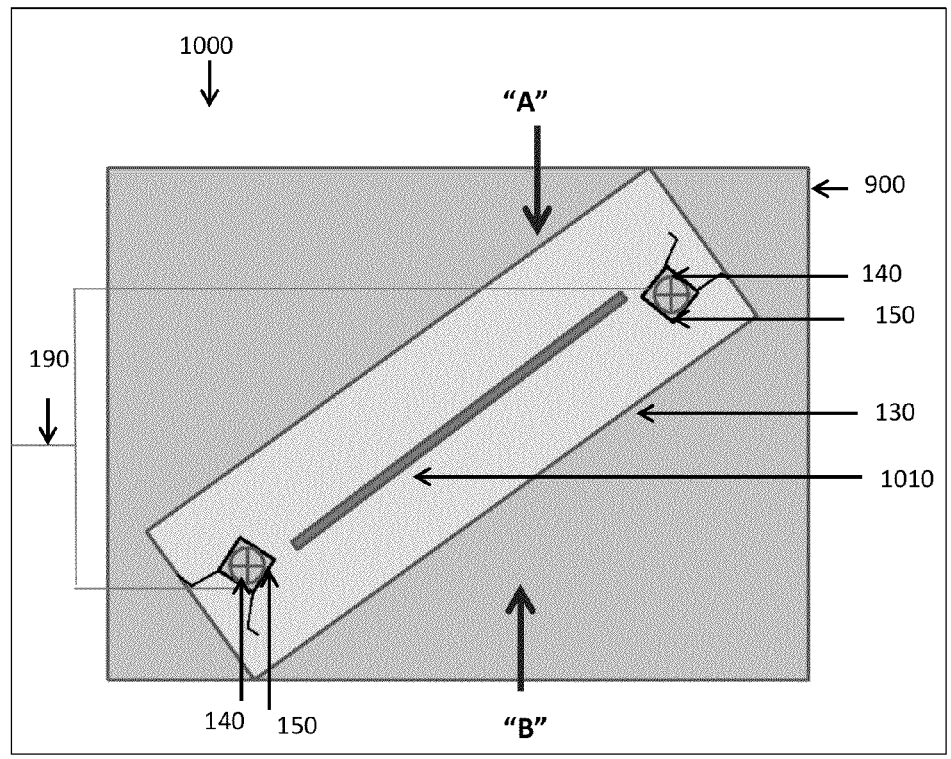
FIG. 10 shows a schematic plan view of a rectangular prism with offset diffuser ducted turbines.

FIG. 10 shows a schematic plan view Barrage apparatus 1000. This embodiment of the invention is suitable for tidal flows. The Barrage apparatus 1000 is positioned perpendicular to the direction of tidal flows that are marked with an arrow and the letter "A" for Flood tides and an arrow and the letter "B" for Ebb tides. The rectangular prism Barrage Wall 1010 is preferably angled approximately 45 degrees away from the direction of either tidal flow. The Wall plate 1010 and the diffuser ducts 150 containing Turbine power take off modules 140 are suitably mounted between the top plate 130 and the base 900. The diffuser ducts 150 are positioned within the downstream flows exiting the extremities of the Barrage wall 1010. The general flow is partially obstructed by the central diagonal Barrage wall 1010 and flow is channeled along the barrage Wall plate 1010 confined between the top plate 130 and the base plate 900 to run off to the path of least resistance that is the downstream open extremity of the barrage Wall 1010. The high velocity flows exiting the Barrage 1010 flow downstream into and around the downstream diffuser duct 150. The low-pressure area created downstream of the diffuser 150 augments flows that are drawn across the turbine power take off module 140. The downstream turbine power take off module 140 extracts more power than the upstream turbine take off module 140. What constitutes the downstream flow from a Barrage Wall 1010 changes and is dependent on the direction of the general flow. Energy is extracted by the turbine power take off module 140 and the electricity generated is transmitted via a subsea cable 190 to a grid or other end user is as previously described. The Barrage Apparatus 1000 is manufactured as either a lightweight (lower density than water) structure fixed to a gravity weighted base 900 or is gravity-weighted (heavier density than water) structure fabricated in concrete or other dense materials. The rectangular prism barrage apparatus 1000 can be varied to operate in single direction currents with the barrage plate 1010 positioned in a vertical incline to flow with the turbine power take off module 140 mounted at the base of the barrage 1010 or alternatively be inclined away from the direction of flow with a turbine power take off module mounted at the top of the Barrage 1000. In both variations the rectangular prism Barrage 1110 is attached to a gravity weighted base 900. A side wall is fixed both sides the Barrage 1010 to assist in the channeling of flows.

Figure 11:
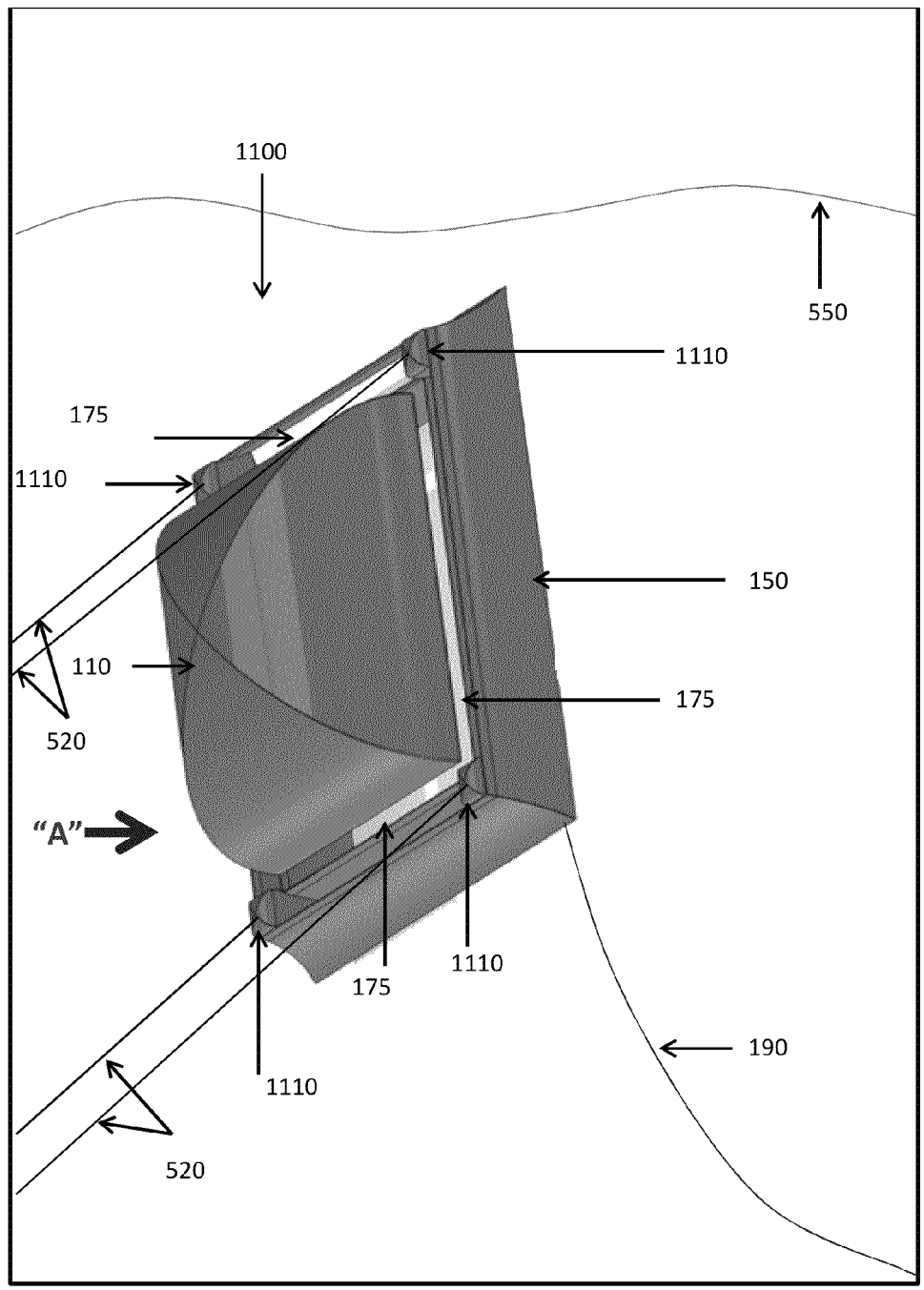
FIG. 11 is a schematic isometric view of a square based pyramidal Barrage fitted with a diffuser duct skirt depicted as a submerged neutrally buoyant device.

FIG. 11 is a schematic isometric view of a Barrage apparatus 1100 that is a further embodiment of the invention. A central square based pyramidal Barrage 110 directs flows to a diffuser duct skirt 150 that is suitably offset and attached to the rear of the Barrage 110 at a dimension that provides a flow opening 175. The diffuser duct skirt 150 accommodates a total of four cross flow turbines mounted between mounting bays 1110. Turbine power take off modules (not shown but previously described) are mounted in horizontal and vertical positions within the diffuser duct 150. The mounting bays 1110 provide anchoring points for cables 520. The barrage 1100 is submerged beneath the sea level 550 and operates as neutrally buoyant device that faces the direction of flows marked with an arrow and the letter "A" The Barrage apparatus 1100 is tethered by the cables 520 to a sea bed mooring that is not shown. The pyramidal Barrage 110 is manufactured using lightweight structural materials previously described and is sealed to act as a buoyancy tank that is raised or lowered using pumped compressed air or water as previously described. Accelerated flows exiting from the pyramidal Barrage 110 wash around and into the diffuser skirt 150 that contains turbine power take off units that are not shown. Energy is extracted by the turbine power take off as previously described and the electricity generated is transmitted via a subsea cable 190 to a grid or other end.

Figure 12:
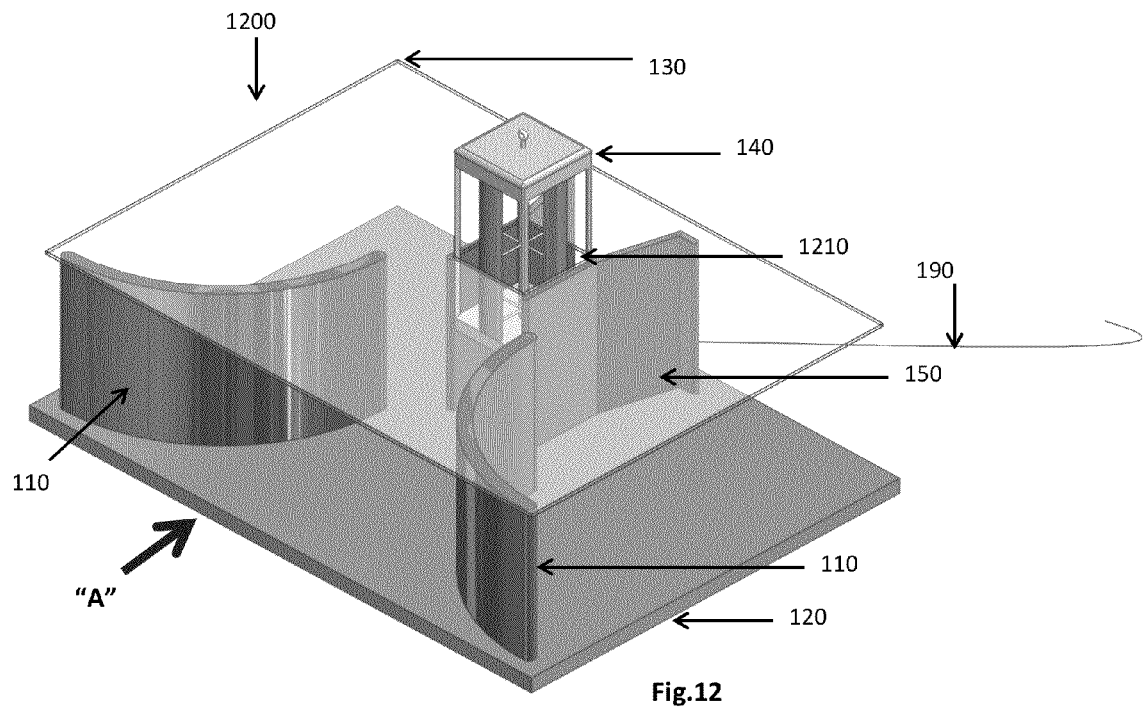
FIG. 12 is a schematic isometric view of a single turbine Barrage module.

FIG. 12 is a schematic isometric view of a single turbine Barrage module 1200 that is another embodiment of the invention that operates as a stand-alone energy extraction device or can be linked by suitable means to other identical single turbine Barrage modules 1200 to form a tidal fence or large open flow barrage. The single turbine Barrage module 1200 comprises an extractable turbine power take off module 140 shown as partially extracted via an opening 1210 in the top plate 130 (that is shown as transparent for clarity). The curved barrage deflector plates 110 that are fixed to the base 120 and top 130 channel and accelerate flows into and around the diffuser duct 150 that contains the turbine power take off module 140. Energy is extracted by the turbine power take off as previously described and the electricity generated is transmitted via a subsea cable 190 to a grid or other end.

Figure 13:
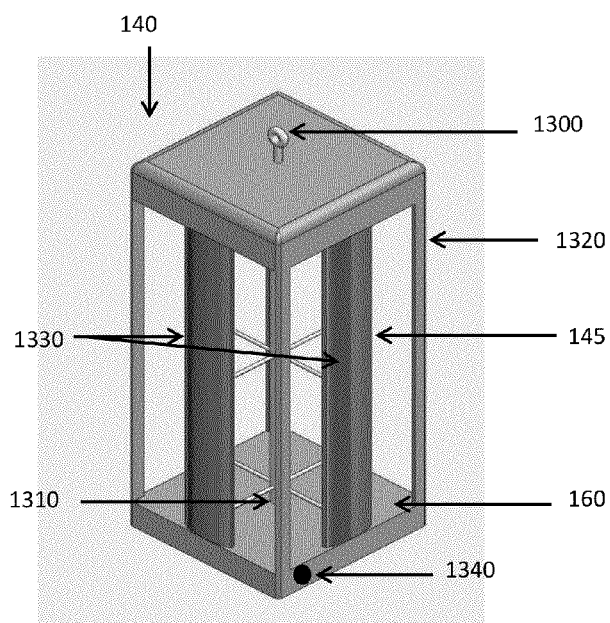
FIG. 13 is a schematic isometric view of a turbine power take off module.

FIG. 13 is schematic isometric view of a turbine power take off module 140 that is another embodiment of the invention houses the only moving components in most of the various barrage installations described in this patent application.

The Module 140 is extracted from barrage installations and replaced as required as previously described. A lightweight structural housing 1320 fabricated in steel or other suitable materials is fitted with a suitable lifting point 1300 that can accommodate a crane hook. The modules are lifted to the surface by a crane mounted on a vessel floating on the sea surface. Within the module 140 is a Darrieus type cross flow turbine 145 is fitted with four blades 1330 (two of which are obscured) that rotate in a vertical axis around a shaft 1310. The shaft 1310 is suitably connected to the magnetic power take off 160 or dynamo which may include suitable gearing or suitable transmission to an electrical generator for power generation by known means. An electrical docking socket 1340 connects the turbine power take off module 140 to the grid connected power cable for transmission of electricity by a subsea cable (not shown) to the grid or other end user. The relatively small turbines extract the same amounts of power as competitors' larger windmill like turbines that are of a size equivalent to the overall dimensions of a Barrage apparatus. Both devices sweep the same or similar area of flows to supply similar power output but the Barrage's turbines 145 are one tenth the size of the competitors' turbines. The turbines 145 small size provides the potential for the manufacture cheaply mass produced turbines. Competitors' turbines due to their large size incur high engineering and material costs and encounter maintenance, installation and operation issues. The Barrage apparatus that incorporates the turbine power take off modules 140 has major capital, installation, maintenance and operational cost advantages over all known marine energy extraction devices. Small turbines have the added advantages that operate for longer in tidal cycles and because they are easily interchanged they are subject to less generational power downtime. Competitors' turbine component failure or catastrophic events potentially take months to repair and incur massive costs.

Figure 14:
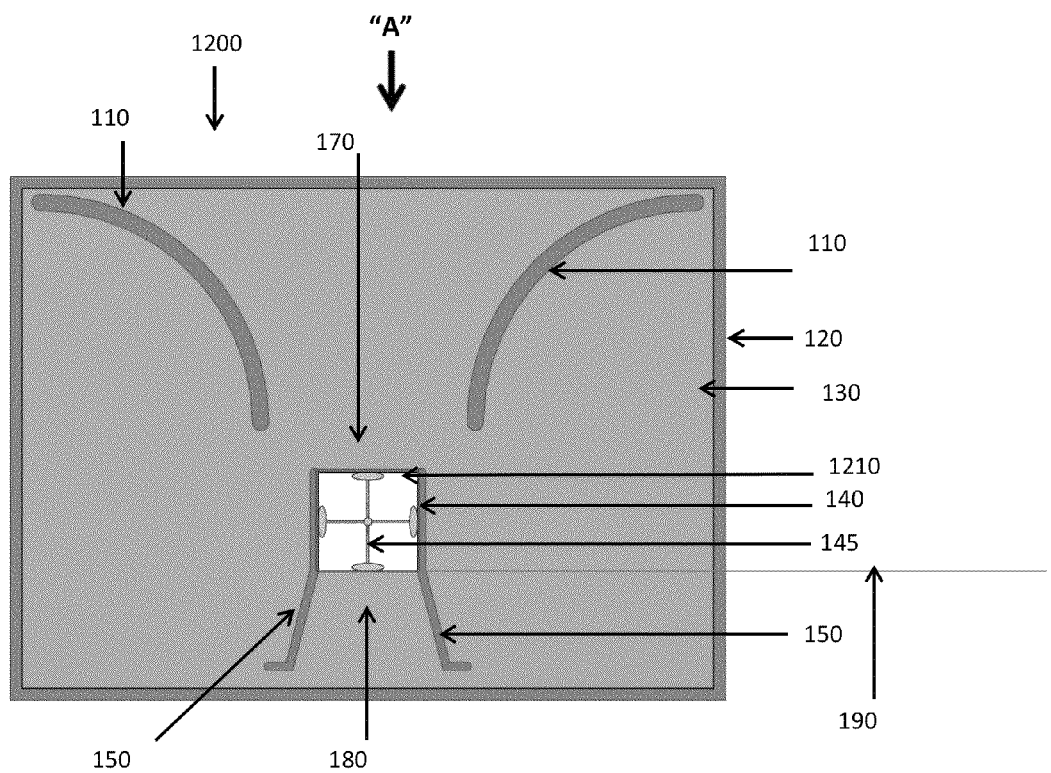
FIG. 14 is a schematic plan view of a single turbine power take off module.

FIG. 14 is a schematic plan view of a single turbine Barrage module 1200 previously described in relation to FIG. 12. The Barrage module 1200 is preferably positioned perpendicular to incoming flows the direction of which is marked by an arrow and the letter "A" The curved side barrage walls 110 are fixed between a base plate 120 and a top plate 130 which has an opening 1210 to allow the extraction and placement of the turbine power take off module 140. The velocity of the flows exiting the Barrage walls 110 is determined by both the general flow of the current within which the apparatus 1200 is submerged and the size of the Barrage walls 110. The larger the Barrage walls 110 are, the greater the velocities of the diverted flows. The higher the velocity is, the greater the energy available to be extracted by the Turbine modules 140. Barrage 1200 provides a more efficient method of extraction of power by providing more power than the same Turbine modules 140 can achieve in the same general fluid flow without the influence of the Barrage walls 110. The flange plated diffuser duct 150 further augment the flows thru the flow passage 170 to 180. The volume and velocity of flows is increased when the single turbine modules 1200 are joined together to form larger barrage.

Figure 15:
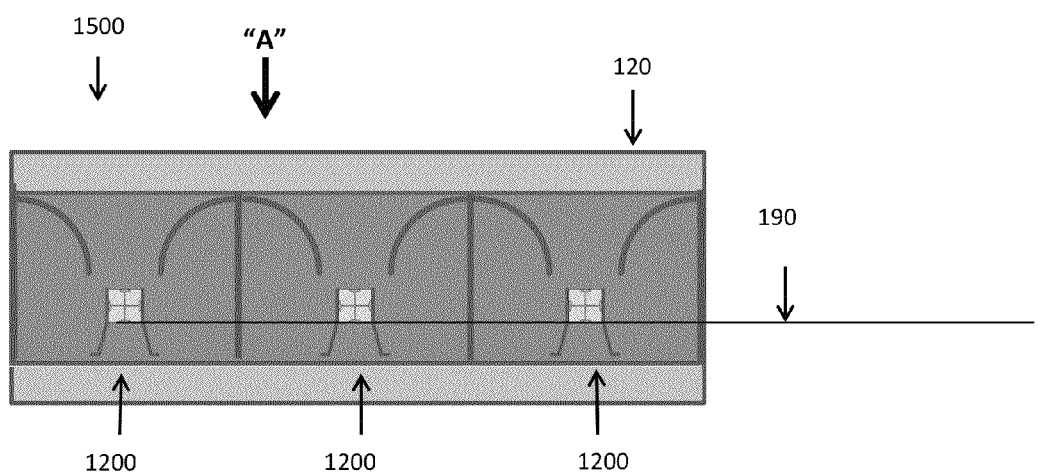
FIG. 15 is a schematic plan view of a barrage comprised of single turbine Barrage modules.

FIG. 15 is a schematic plan view of a barrage array 1500 comprised of single turbine Barrage modules 1200 that are suitably joined together to form an energy farm. The advantages of such an energy farm are that infrastructure costs like grid connection and maintenance are reduced compared to diversely positioned stand alone barrage installations. Four single turbine modules 1200 are shown joined together to generate and feed electricity as previously described to a common subsea electric cable 190. Barrages 1500 may be aligned perpendicularly to the direction of flow marked by an arrow and the letter "A" or may be positioned in a line at varying degrees either inclined toward or away from flow. The Barrages 1500 may also be grouped in clusters in a local region that feeds electricity to a central substation that may be above or below the surface to provide a common transmission line to a grid.

Figure 16:
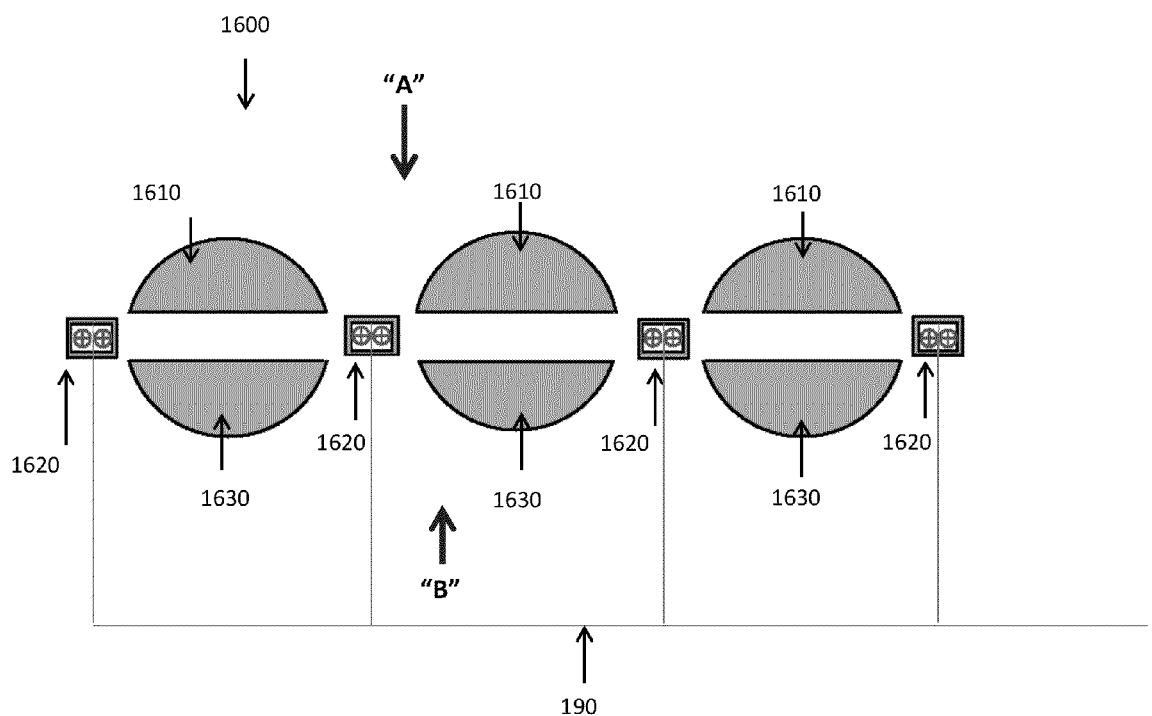
FIG. 16 is a schematic plan view of an array of parabolic Barrages positioned either side of freestanding gravity weighted ducted twin turbines modules.

FIG. 16 is a schematic plan view of another embodiment of the invention that are arrays of a plurality of parabolic Barrages 1600 (other suitable geometric shaped barrages can be deployed).

The submerged gravity weighted Barrages 1610 have a density greater than water so that is a semi-permanent installation manufactured as a solid unit fabricated in concrete or other suitable materials or is a manufactured structural form filled with rock or other dense materials. The Barrages 1610 and 1630 are suitably positioned perpendicular to the direction of two way tidal flows which are marked by an arrow and the letter "A" for flood tides and an arrow and the letter "B" for ebb tides. Suitably positioned between the Barrages 1610 are freestanding gravity weighted ducted twin cross flow turbine power take off modules installations 1620. The size a number of turbines incorporated in an installation 1620 may be varied to suit site conditions. Cross flow Darrieus type turbines are considered suitable because they extract energy from flows from opposite directions. The turbines are not limited to the cross flow types and other larger turbines may be employed without the need of being housed within a duct. Turbines fitted with a diffuser duct that turns to face oncoming flow as described in relation to FIG. 8 may also be employed. The parabolic Barrages 1610 and 1620 obstruct flows increasing the velocity of downstream flows that flow to the turbine power take off modules 1620. Fluid flows from the direction marked with an arrow and the letter "A" impact the Barrages 1610 and split to form higher velocity flows that exit either side of the Barrage 1610 to flow downstream to sweep over the Turbine modules 1620. At the turn of the tide the flow is from the opposite direction marked by an arrow and the letter "B" that therefore impacts on the Barrages 1630 that direct accelerated flows to the turbine power take off module installation 1620.

The modules 1620 extract energy from accelerated flows from the barrage 1610 or 1630 that is upstream in a particular flow. What constitutes an upstream barrage depends on the direction of flow. The energy is extracted from the flows is converted to electricity by the turbine power take off modules 1620 and is fed via an electricity cable 190 to an electricity grid or other end user as previously described.

Figure 17:
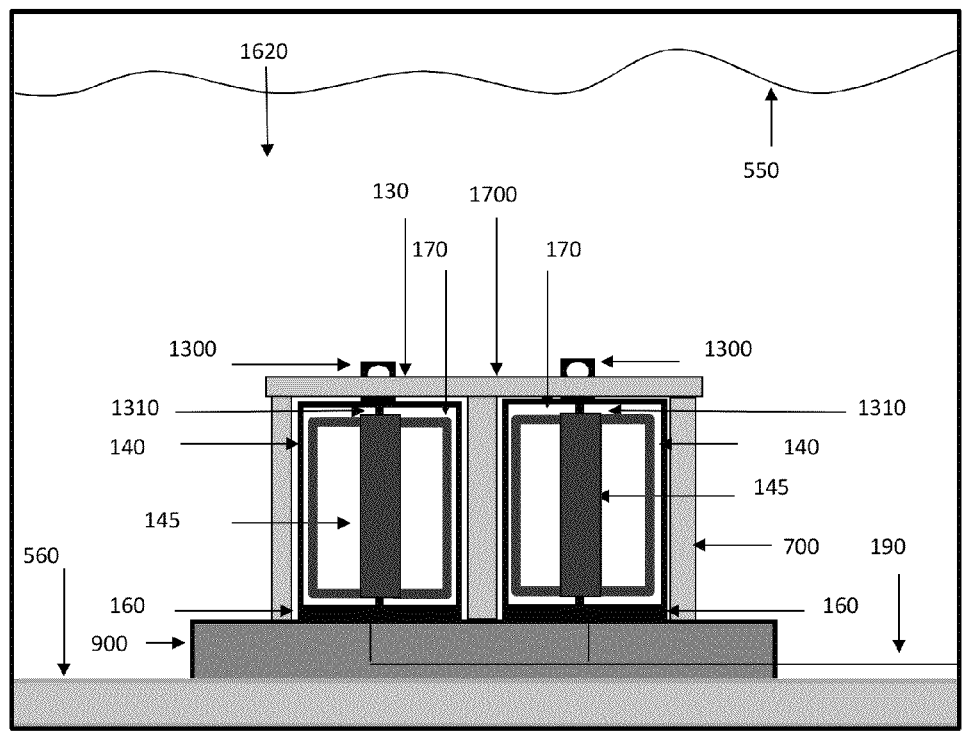
FIG. 17 shows a schematic cross-section of two turbine power take off modules contained within a structure fixed to a gravity weighted base.

FIG. 17 shows a schematic cross-section of a free standing gravity weighted two turbine power turbine apparatus 1620 that forms part of the array Barrage and Turbine Installation previously described in relation to FIG. 16. The containment structure 1700 has an inlet opening 170 and outlet opening 180 at the front and back of the structure and is open at the top 130 to allow for insertion and removal of a Turbine module 140. The open inlet 170 and outlet 180 of the containment structure 1700 allow fluid to flow through the Turbine module 140 to Turbines 145. Mounted within the Turbine module 140 in the flow passage 170 to 180 for rotation above a vertical axis around a shaft 1310 is a Turbine 145 that is comprised of blades for extracting energy from the fluid flowing through the Turbine module 140. A power take off 160 mounted at the base of the Turbine module 140 is coupled to the Turbine shaft 1310 through any suitable transmission such as a gear transmission such that rotation of the shaft 1310 causes the power take off or dynamo 160 to generate electricity. An electrical cable 190 is connected to the power take off 160 and leads to an above surface location power grid or other end user. A lifting cleat 1300 is attached to the top of the Turbine module 140 to facilitate installation and removal.

Figure 18:
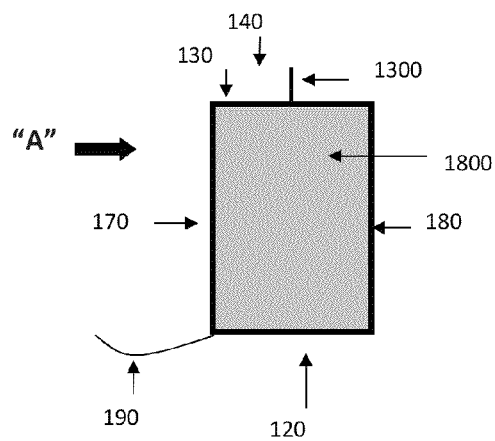
FIG. 18 shows a schematic side elevation of a turbine power take off module.

FIG. 18 shows a schematic side view of a Turbine module 140 suitable for a vertical axis Turbine 145. Turbine modules 140 may vary according to applications but typically comprise a top planar wall 130 and base planner wall 120 and opposite planar sidewalls 1800 with an inlet opening 170 and outlet opening 180 that allow fluid to flow through what is effectively a passage way. An arrow and the letter "A" mark the direction of flow.

Figure 19:
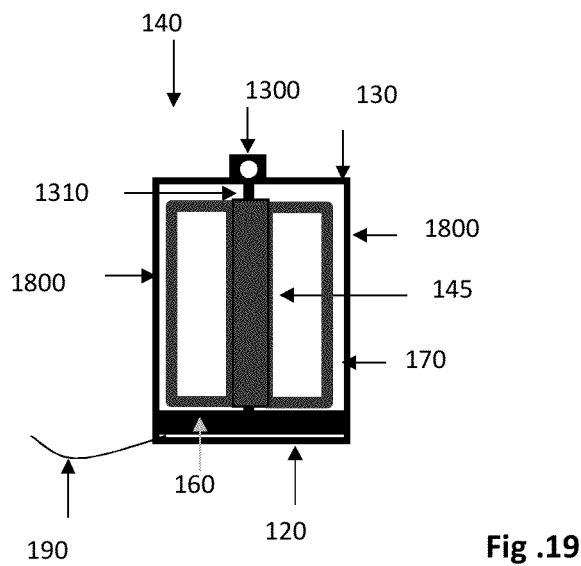
FIG. 19 shows a schematic cross-section view of a turbine power take off module.

FIG. 19 shows a schematic cross-section view of a turbine power take off module. A lifting cleat 1300 is attached to the top of the module to facilitate installation and removal. Mounted within the Turbine module 140 in the flow passage 170 to 180 for rotation above a vertical axis around a shaft 1310 is a cross flow Turbine 145 for extracting energy from the fluid flowing through the module 140. A power take off 160 mounted at the base is coupled to the Turbine 145 through any suitable transmission such as a gear transmission such that rotation of the turbine 145 causes the power take off 160 to generate electricity. An electrical cable 190 is connected to the power take off 160 and leads to any above surface location where the power generated is fed to a power grid or other end user.

Figure 20:
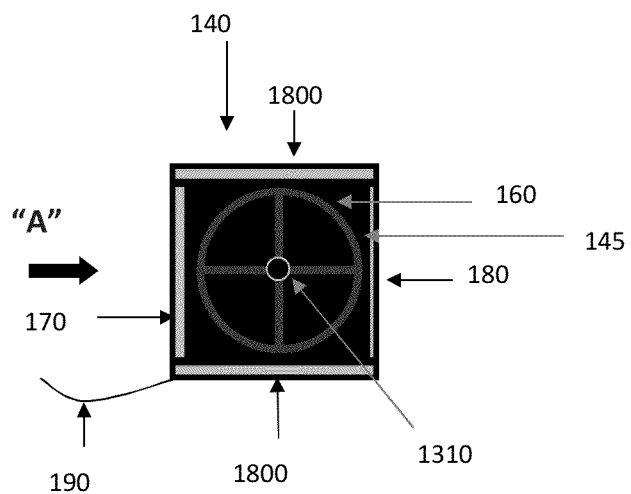
FIG. 20 shows a schematic plan view of a turbine power take off module.

FIG. 20 shows a schematic plan view of a turbine power take off module 140 with the top planner wall 130 omitted for clarity. An arrow marked "A" shows the direction of fluid flow. The flow entering the inlet 170 is directed along the passageway created by wall panels 1800, and top panel 130 and base 120 of the Turbine module 140 to rotate the cross flow Turbine 145 that drives the power take off 160 to generate electricity as previously described.

The invention may provide many benefits which may include at least some of the following:
1. A method for successful extraction of the renewable energy source from fluid flows for the generation of electrical energy.
2. Overcoming the limitations in energy capacity of marine turbine installations as currently being experienced.
3. Increasing the energy extraction from fluid flows.
4. Overcoming the disadvantages of present methods of energy extraction from fluids in order to provide produce large quantities of energy from energy sources in flowing fluids.
5. Providing a method of increasing the velocity of fluids.
6. Enabling increased energy in higher velocity fluid flows be extracted efficiently and more cost effectively by using smaller marine turbines.
7. Providing a method that vastly increases the number of potential sites for commercial operation that have previously been considered unviable for marine energy extraction due to insufficient flow velocities.
8. Enabling operation in shallow, near shore and low velocity flow locations.
9. Enabling operation in high velocity and deep water locations.
10. Adaptability to marine currents, tidal flows, water flows, man-made fluid flows and other fluid flows.
11. Enabling the apparatus to operate as a gravity weighted structure.
12. Enabling the apparatus to operate as a lightweight buoyant structure.
13. Enabling the apparatus to use existing turbines in a more efficient manner than is currently being experienced.
14. Providing the option to use smaller, cost effective, mass-produced turbines.
15. Providing a simple, structurally sound, cost efficient and well-engineered apparatus.
16. Providing a simple manufactured solution in that most components of the apparatus will not require costly, high precision, engineering work.
17. Providing an apparatus that is cost effective, modular and scalable to needs that operates as a stand-alone device or in an array or in an energy farm format to provide commercial volume lower cost electricity.
18. Providing an apparatus that it is designed to minimise transport and installation costs.
19. Enabling the Barrage and turbine power take off modules where possible to be prefabricated off site with quick assembly and deployment on site.
20. Enabling certain components to be flat-packed for storage and transport.
21. Enabling the apparatus to be deployed cost-effectively with quick response times in disaster relief situations.
22. Providing a non polluting and environmentally benign design.
23. Enabling the apparatus to be submerged and therefore having low visual and noise impact.
24. Providing minimal impact on marine life and to this end turbine modules can be fitted with suitable known debris guarding and mesh protection to ensure fish are not harmed.
25. Providing a minimal carbon footprint and minimal impact on marine life and to this end the device that is a gravity weighted structure may not require decommissioning as it can potentially act as artificial reef.
26. Overcoming the negative effects on the environment of fossil fuel consuming energy generation.
27. Enabling the cost per kilowatt-hour of energy to be cheaper or at least competitive to other renewable energy power supply costs and that the cost of energy will potentially compare favourably with the costs of fossil fuel consuming energy supply.

Throughout the description and claims of this specification the word "comprise" and variations of that word such as "comprises" and "comprising", are not intended to exclude other additives, components, integers or steps.

The invention claimed is:

1. A barrage apparatus for extracting energy from a fluid flow, the apparatus comprising:
a barrage having a surface adapted to increase the velocity of fluid flowing along the surface, and at least one turbine module having an inlet, an outlet and a turbine, the inlet being spaced from the surface, said increased velocity fluid able to flow into the inlet, operate the turbine and flow out of the outlet, the spacing between the surface and inlet defining a by-pass opening to direct increased velocity fluid past the turbine module and the outlet to assist in passage of fluid through the turbine module, characterized in that (a) the turbine module comprises a housing having an inner side wall and an outer side wall which are spaced apart, the turbine adapted to locate between the side walls, the inner side wall and the barrage surface defining at least part of the by-pass opening, and (b) the barrage comprises a parabolic shape when viewed in plan, said turbine module being located adjacent each curved end of the surface.

2. A barrage assembly comprising at least two apparatus as claimed in claim 1.

3. The apparatus of claim 1, wherein the outlet is larger than the inlet to facilitate a lower pressure region behind the outlet.

4. The apparatus of claim 3, comprising outwardly extending flanges adjacent the outlet to facilitate a lower pressure region behind the outlet.

5. The apparatus of claim 1, comprising a top plate and a base plate, the barrage and the at least one turbine module extending therebetween.

6. The apparatus of claim 1, including a support means to support the apparatus in a fluid flow.

7. The apparatus of claim 1, wherein the barrage surface is substantially planar and inclined to the fluid flow to accelerate fluid towards the at least one turbine module.

8. The apparatus of claim 1, wherein the barrage surface has a substantially square based pyramid surface to accelerate fluid towards the at least one turbine module.

9. The apparatus of claim 1, comprising a first said barrage having a surface adapted to increase the velocity of fluid flowing along the surface, and a second barrage having a surface adapted to increase the velocity of fluid flowing along the surface, the at least one turbine module being positioned between said first and second barrage, the surface of the first barrage and the inlet defining a first by-pass opening, and the surface of the second barrage and the inlet defining a second by-pass opening, each opening adapted to direct increased velocity fluid past the turbine module and the outlet to assist in passage of fluid through the turbine.

10. The apparatus of claim 1, wherein the turbine is removable from the module.

11. The apparatus of claim 1, wherein the turbine module comprises a turbine and a power take off to generate electric power upon operation of the turbine.

12. The apparatus of claim 1, including at least one buoyancy means to enable the apparatus to be positioned in a fluid flow.

13. The apparatus of claim 12, including a rudder to maintain the apparatus in the correct orientation in the fluid flow.

\* \* \* \* \*